United States Patent
Everline et al.

(10) Patent No.: US 11,046,138 B2
(45) Date of Patent: *Jun. 29, 2021

(54) ADJUSTABLE FLOATING TRACTION BAR

(71) Applicant: Fox Factory, Inc., Braselton, GA (US)

(72) Inventors: Matthew Everline, Quincy, MI (US); Chadwick J. Kern, Three Rivers, MI (US); David Devormer, Scotts Valley, CA (US); Jared Ball, Scotts Valley, CA (US)

(73) Assignee: Fox Factory, Inc., Braselton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/425,719

(22) Filed: May 29, 2019

(65) Prior Publication Data
US 2019/0275852 A1 Sep. 12, 2019

Related U.S. Application Data

(63) Continuation of application No. 15/382,423, filed on Dec. 16, 2016, now Pat. No. 10,315,480.

(60) Provisional application No. 62/269,849, filed on Dec. 18, 2015.

(51) Int. Cl.
*B60G 7/00* (2006.01)
*B60G 7/02* (2006.01)
*B60G 11/04* (2006.01)

(52) U.S. Cl.
CPC ............ *B60G 7/003* (2013.01); *B60G 7/008* (2013.01); *B60G 7/02* (2013.01); *B60G 11/04* (2013.01); *B60G 2202/112* (2013.01); *B60G 2204/143* (2013.01); *B60G 2204/4302* (2013.01); *B60G 2204/4306* (2013.01); *B60G 2206/111* (2013.01)

(58) Field of Classification Search
CPC ...... F16F 1/04; F16F 1/041; F16F 1/06; F16F 3/04; F16F 3/06; B60G 7/003; B60G 2206/111
See application file for complete search history.

(56) References Cited

U.S. PATENT DOCUMENTS

| | | |
|---|---|---|
| 2,437,631 A | 3/1948 | Kaye |
| 3,211,468 A | 10/1965 | Fort |
| 3,342,141 A | 9/1967 | Browne |
| 3,393,883 A | 7/1968 | Smith et al. |
| 3,682,102 A | 8/1972 | Pocklington et al. |
| 5,291,974 A | 3/1994 | Bianchi |
| 6,193,433 B1 | 2/2001 | Gutierrez et al. |
| 6,488,298 B1 | 12/2002 | Cramatte |
| 6,942,204 B2 | 9/2005 | Wolf et al. |
| 7,677,359 B2 | 3/2010 | Vigran et al. |
| 9,188,184 B2 | 11/2015 | Adoline et al. |
| 10,315,480 B2 | 6/2019 | Everline et al. |

(Continued)

*Primary Examiner* — James A English

(57) ABSTRACT

An adjustable floating traction bar is disclosed. The traction bar comprises a rigid body having a threaded portion on a first distal end to receive a threaded eyelet having a spherical joint to provide a connection point to an axle of a vehicle. The traction bar further comprises an opposing distal slip end being machined and fitted with a UHMW (ultra high molecular weight) polyethylene bushing that acts as a slipjoint the slip joint having a first end that mounts to the UHMW polyethylene bushing of the tubular body and an opposing end having an eyelet to provide a connection point to a vehicle frame. A two-stage nested coil spring located inside the slip end of the rigid body that rests against the slip joint end when it is inserted into rigid body.

20 Claims, 9 Drawing Sheets

(56) References Cited

U.S. PATENT DOCUMENTS

| | | |
|---|---|---|
| 2003/0141641 A1 | 7/2003 | Adoline et al. |
| 2004/0222579 A1 | 11/2004 | Adoline et al. |
| 2005/0029719 A1 | 2/2005 | Adoline et al. |
| 2006/0027955 A1 | 2/2006 | Adoline et al. |
| 2016/0084333 A1 | 3/2016 | Adoline et al. |
| 2018/0216692 A1 | 8/2018 | Coaplen et al. |

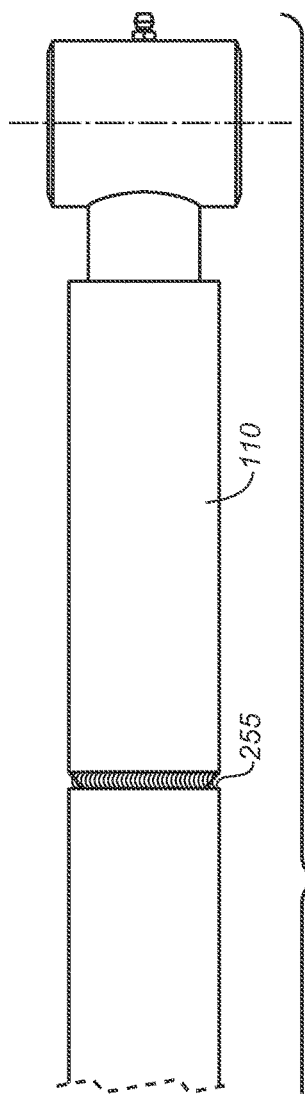
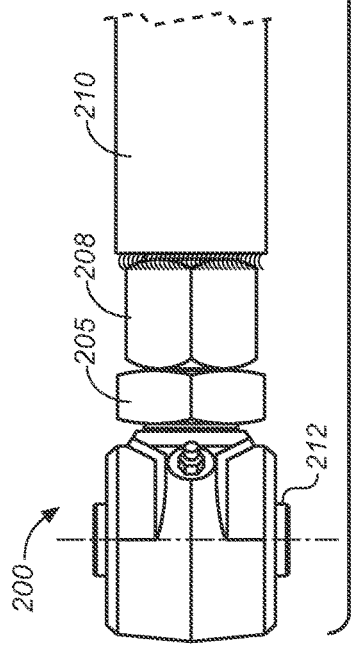
FIG. 2A
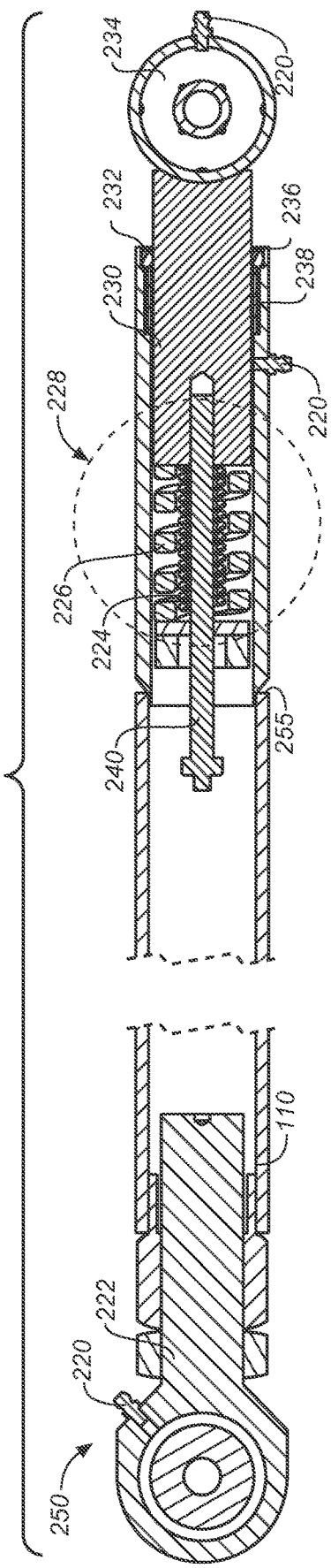
FIG. 2B

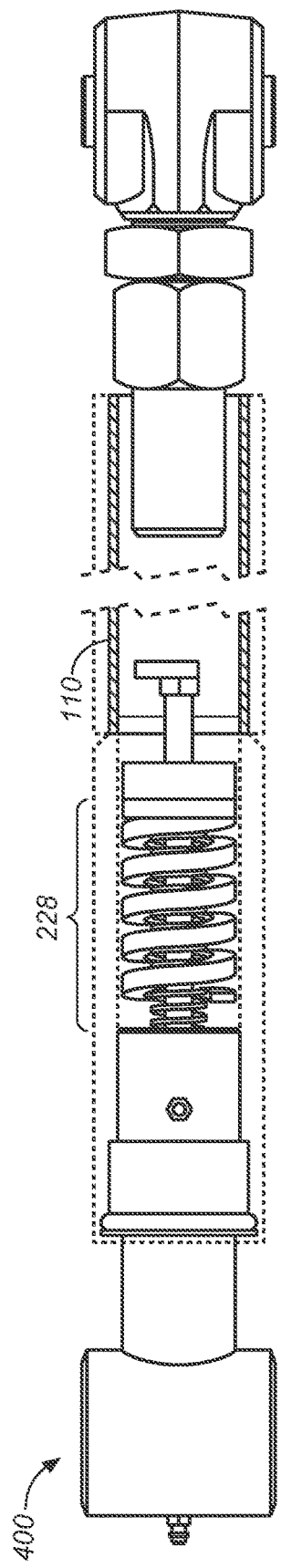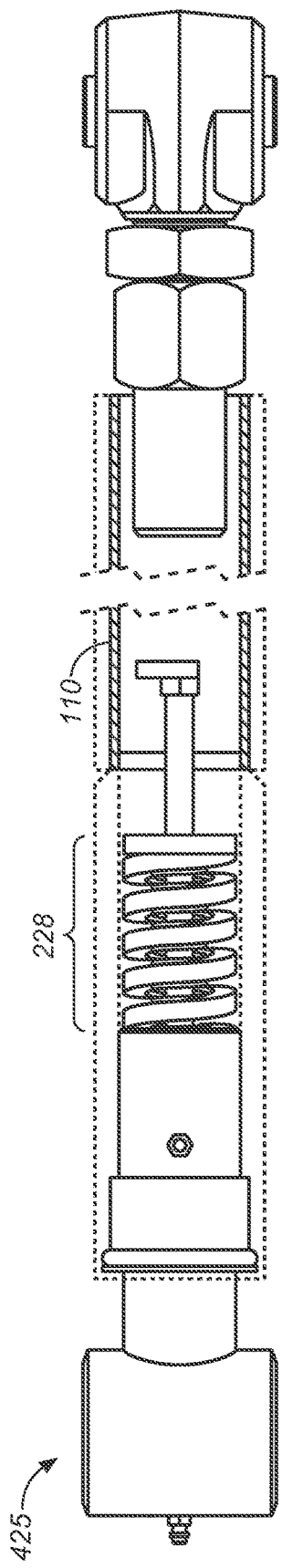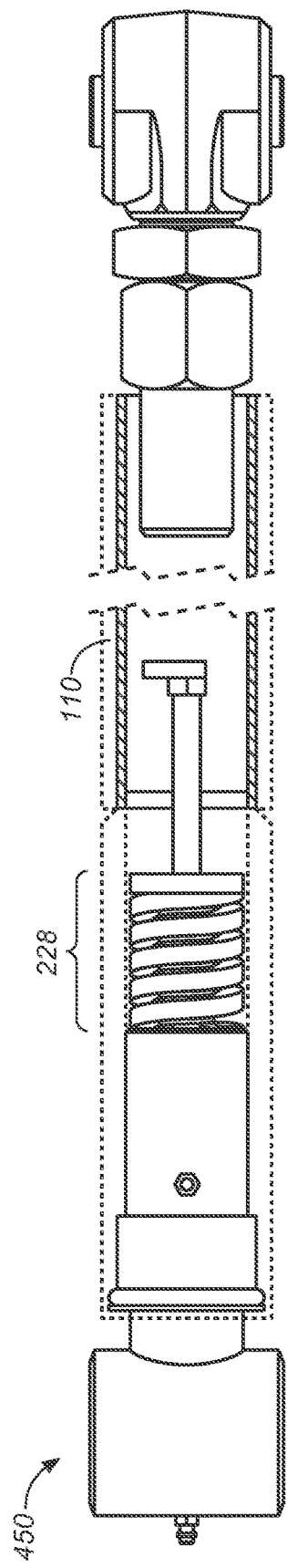

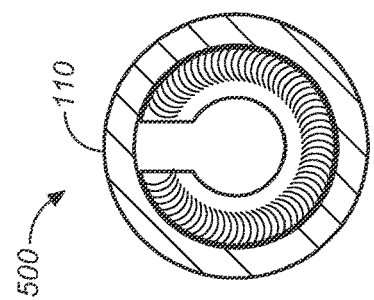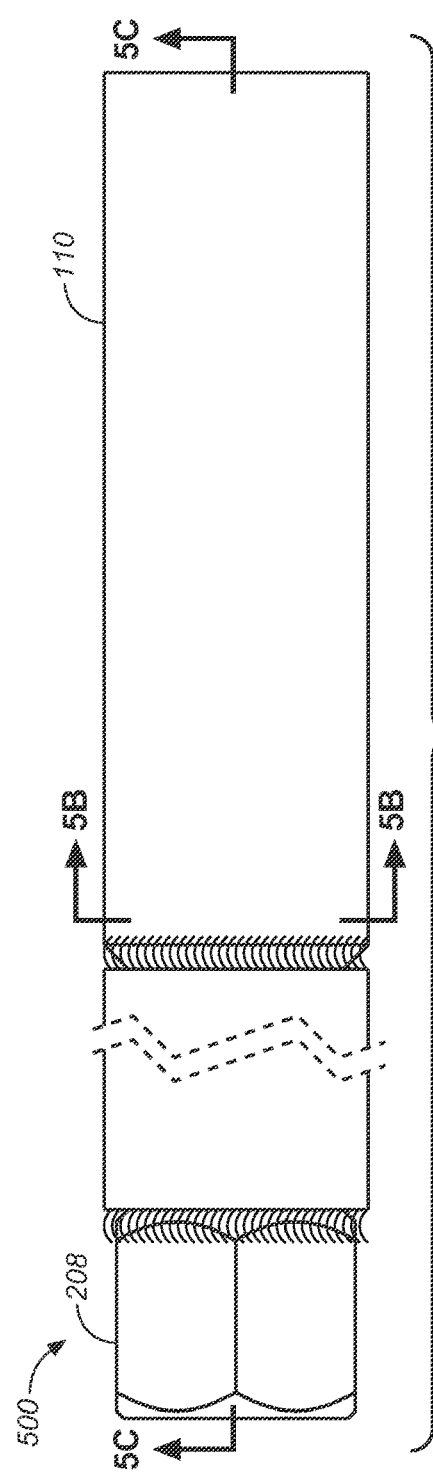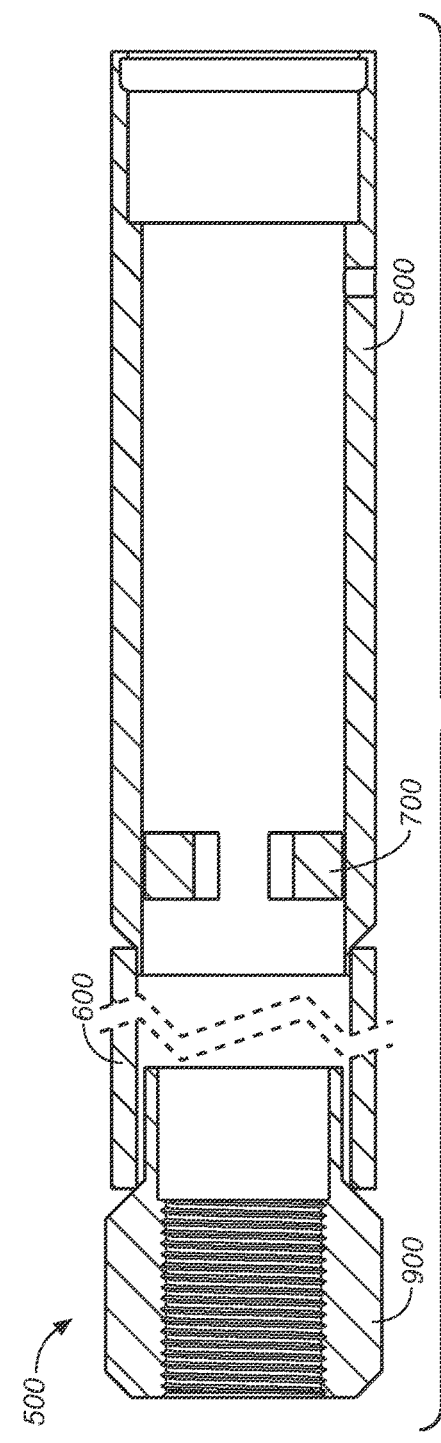

ADJUSTABLE FLOATING TRACTION BAR

CROSS-REFERENCE TO RELATED APPLICATIONS

This application claims priority to and is a continuation of the co-pending U.S. patent application Ser. No. 15/382,423 filed on Dec. 16, 2016 entitled "ADJUSTABLE FLOATING TRACTION BAR" by Matthew Everline et al., and assigned to the assignee of the present application, which is incorporated herein by reference in its entirety.

This application claims priority to and benefit of U.S. Provisional Patent Application No. 62/269,849 filed on Dec. 18, 2015 entitled "ADJUSTABLE FLOATING TRACTION BAR" by Matthew Everline, and assigned to the assignee of the present application, which is incorporated herein by reference in its entirety.

BACKGROUND

Embodiments of the invention generally relate to methods and apparatus for use in vehicle suspension. Particular embodiments relate to an adjustable floating traction bar. Typically, traction bars are used to reduce axle winding on solid axle vehicles equipped with leaf spring suspension systems. A pair of traction bars are provided for each side of the axle. Each traction bar is coupled to the frame of the vehicle at one end and coupled to the axle at the other end. As the vehicle accelerates, the torque from the wheel causes may cause the axle to twist the leaf springs into an S-shape. The tires may slip, hop, and otherwise lose traction. Traction bars function to resist the twisting action but at the expense of limiting the travel of the suspension system. The traction bars may restrict one or more degrees of freedom for movement of the axle relative to the frame due to rigid connections that rotate in a single plane at each end of the traction bar and fixed lengths. The traction bars may for example limit the vertical travel of the suspension or the ability of the axle to rotate about a longitudinal axis of the vehicle. For this reason, traction bars may have desirable disadvantages such as reduced payload capacity, on-road harshness, and limited off-road capability for varying terrain.

BRIEF DESCRIPTION OF THE DRAWINGS

FIG. 2A is an external view showing an embodiment of the disclosed adjustable floating traction bar.

FIG. 2B is an internal view showing an embodiment of the disclosed adjustable floating traction bar.

FIGS. 4A, 4B and 4C are internal views showing embodiments of the two stage nested coil springs in different levels of compression.

FIGS. 5A, 5B and 5C are section views showing an embodiment of the disclosed adjustable floating traction bar.

The drawings referred to in this description should be understood as not drawn to scale unless specifically noted as such. Labels used herein, descriptive or otherwise, are for convenience or illustration only and should not be construed as limiting of the invention disclosed herein or necessarily indicative of any prior art or admission thereof.

DESCRIPTION

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is applicable to alternative embodiments, modifications and equivalents, which may be included within the spirit and scope of the invention as defined by the appended claims.

Furthermore, in the following description of embodiments, numerous specific details are set forth in order to provide a thorough understanding of the present technology. However, the present technology may be practiced without these specific details. In other instances, well known methods, procedures, and components have not been described in detail as not to unnecessarily obscure aspects of the present disclosure.

The following disclosure provides a description of embodiments of an adjustable traction bar design and the components developed. The adjustable floating traction bar includes the use of a two-stage nested coil springs to provide resistance adjustment as well as threaded and slip ends to facilitate that adjustment. Thus, the overall design allows for the bar to "float" or provide negligible resistance to desirable suspension movement (compression, extension, articulation, braking) and thus does not adversely affect the suspension function or ride quality. In various embodiments of the present invention, adjustment is accomplished via threaded coupling, ratchet mechanism, or other self-locking adjustment features. Also, in various embodiments of the present invention, adjustment is made via a stepper motor or other motive device.

Figure 1:
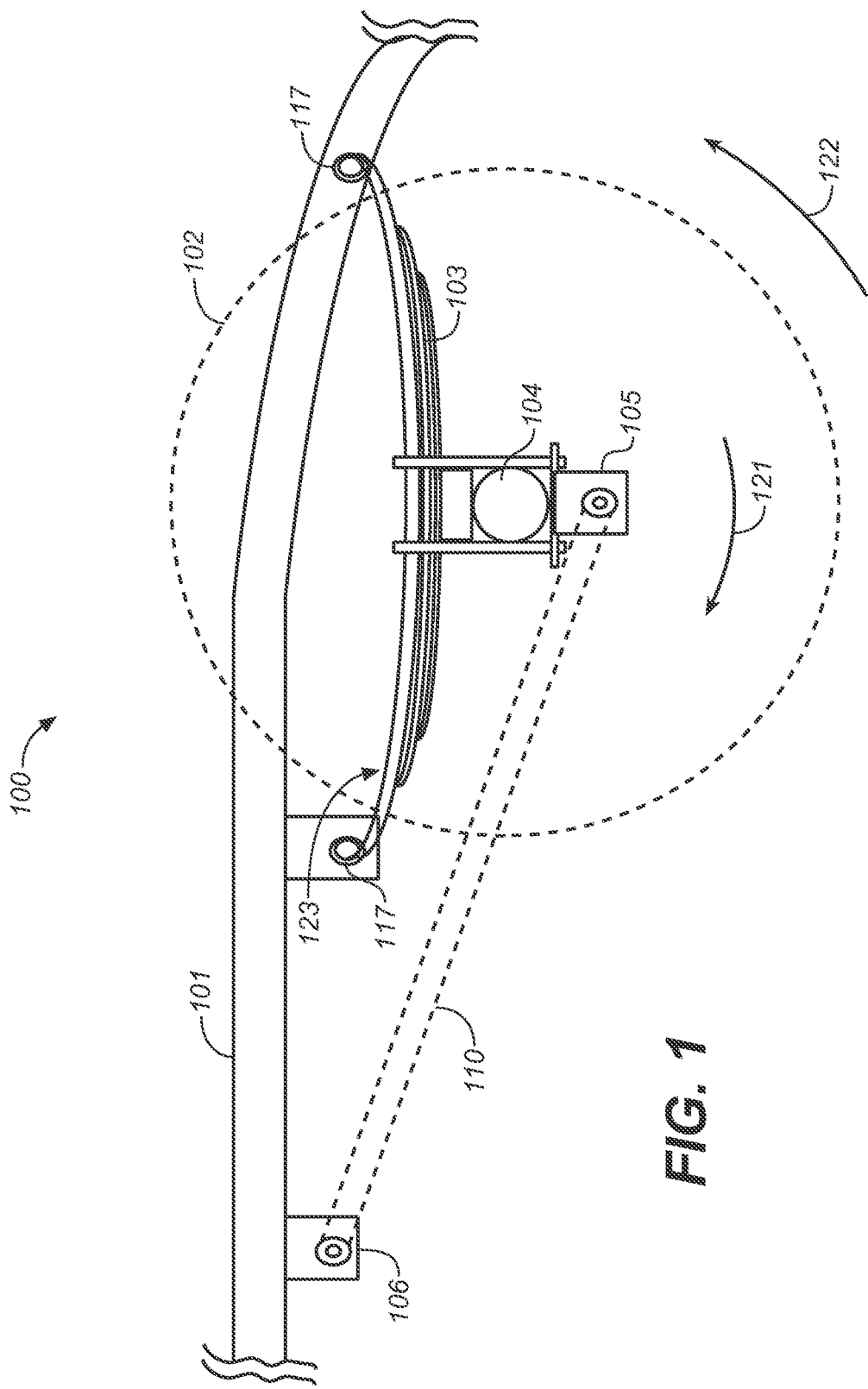
FIG. 1 is a section view showing an embodiment of a rear portion of a vehicle having a leaf spring supported axle.

Referring now to FIG. 1, a section view 100 illustrates an embodiment of a rear portion of a vehicle having a leaf spring supported axle. FIG. 1 includes a frame 101, a wheel 102, a leaf springs 103, a drive axle 104, a rear axle bracket 105, a frame bracket 106, a wheel rotation 122 direction indicator and a rotational force 121 indicator. The traction bar 110 is also shown in an optional configuration.

In general, leaf springs 103 are flexible steel bars of different lengths with a fastener 117 on each of the front and rear ends thereof to allow the leaf springs 103 to connect to the vehicle frame 101. Leaf springs 103 are found on both sides of the vehicle. The drive axle 104 is fastened to the middle of the leaf springs 103 and depending upon the configuration may be fastened below the leaf springs 103 (as shown) or above the leaf springs 103.

In operation, when the vehicle is accelerated wheel 102 will turn in wheel rotation direction 122. Although the wheel rotation is shown in direction 122 it is merely for purposes of clarity, the wheel 102 may be rotated in either direction during operation. However, when wheel 102 rotates in direction 122 axle 104 will feel a resulting rotational force 121 in the opposite direction. Leaf spring 103 is used to provide some give to axle 104 which results in a rotational force 123 being felt at fastener 117.

Although it can occur at any speed, under moderate to heavy acceleration the applied forces can cause the axle housing to rotate about the axle shaft and deform or bend the leaf springs 103 such as into an S-shape. In extreme cases, uncontrolled axle wrap can cause damage to leaf springs 103, axle 104, and driveline components. For example, if the axle rotates it can cause the drive shaft to have to spin at an angle which can cause drive shaft failure, vibration and the like. Moreover, deformation of the leaf springs 103 can also result in loss of traction and/or undesirable suspension movement (hop) under heavy acceleration in some cases.

In one embodiment, by fixedly coupling adjustable floating traction bar 110 with a fixed bracket about the vehicle axle 104 and at a location on the vehicle frame 101 as shown in FIG. 1, the adjustable floating traction bar 110 will provide additional support to resist axle rotation or wrap of a leaf spring 103 equipped vehicle.

With reference now to FIG. 2A an external view 200 showing an embodiment of the disclosed adjustable floating traction bar 110. FIG. 2B is an internal view 250 showing an embodiment of the disclosed adjustable floating traction bar 110.

Referring to FIG. 2A, in one embodiment adjustable floating traction bar 110 has a steel tubular body 210. In one embodiment, steel tubular body has a 2" outside diameter and length of approximately 55-60". One end of the body is threaded while the other is machined and fitted with an ultra high molecular weight (UHMW) polyethylene bushing 238 that acts as a slip-joint. Although a number of dimensions are provided, the present technology may utilize different diameters and lengths depending upon the desired application. Moreover, throughout the following discussion, it should be appreciated that one or more of the components of adjustable floating traction bar 110 described herein, may be made from other materials such as aluminum, carbon fiber, etc. Further, although a tubular body is disclosed, the body may consist of one or more different geometric shapes.

In general, the external features of adjustable floating traction bar 110 include a spherical joint 212, a jam nut 205, an adjustable collar 208 to adjust preload and a weld stop 255 welded to tubular body 210. In one embodiment, the adjustable collar 208 is a hex shaped adjustable collar 208.

With reference now to FIG. 2B, in one embodiment, adjustable floating traction bar 110 includes a forged threaded eyelet 222, a two stage nested coil springs 228, a fabricated steel slip joint end 230, a retaining ring 232, a poly bushing 234, an O-ring 236, a centering rod with locking tab 240, and a plurality of grease zerks 220. Although a number of components are discussed, there may be more of fewer components while still retaining the meets and bounds of the present technology. For example, in one embodiment, one or more of grease zerks 220 may be optionally removed when low maintenance bushings 234 that do not require grease zerks are utilized. In various embodiments of the present invention, bushings are not utilized.

In one embodiment, forged threaded eyelet 222 mounts to the threaded end of the tubular body 210. The housing of forged threaded eyelet 222 contains spherical joint 212 that provide an attachment point to the vehicle's axle 104 or axle bracket 105. The spherical joint 212 allows for a limited degree of angular movement (approx. 30 degrees) and unrestricted rotational freedom. The end is held fixed to the tubular body 210 with jam nut 205. In various embodiments of the present invention, an eyelet could be comprised of any type of coupling with the vehicle, including, but not limited to, ball joints or other linkages and hinges.

In one embodiment, fabricated steel slip joint end 230 mounts to the UHMW-bushed end of the tubular body 210. The eyelet of the steel slip joint end 230 contains polyurethane bushings 234 and a steel sleeve that provides an attachment point to the vehicles frame 101, such as via frame bracket 106 or directly to vehicle frame 101. The polyurethane bushings 234 provide rotation freedom. In one embodiment, the slip joint end 230 provides rotational freedom about tubular body 210 ID as well as limited "slip" movement along the center axis of tubular body 210.

Figure 3:
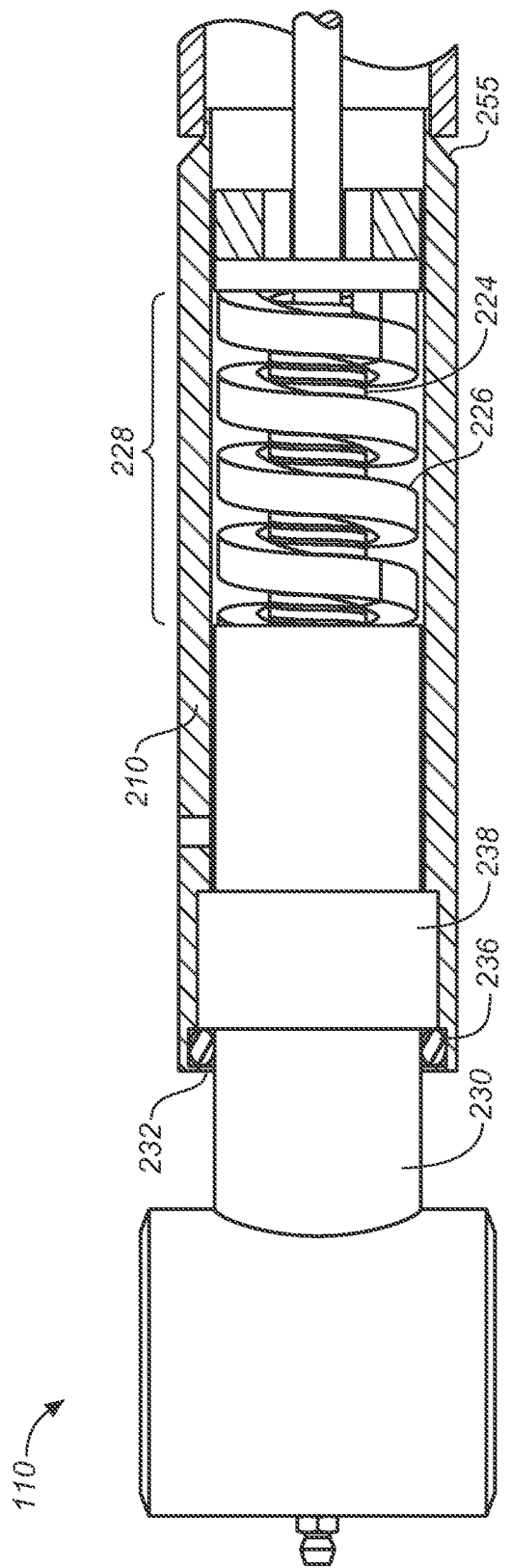
FIG. 3 is an internal view showing an embodiment of the two stage nested coil springs of the adjustable floating traction bar.

Referring now to FIG. 3, an internal view showing an embodiment of the two stage nested coil springs 228 of the adjustable floating traction bar 110 is provided. In general, FIG. 3 is utilized to provide a closer view of the two stage nested coil springs 228. In one embodiment, the two stage nested coil springs 228 includes a high rate spring 226 and a low rate spring 224. The two stage nested coil springs 228 is located inside the slip end of the tubular body 210 and rest against a weld stop 255. The springs also rest against the steel slip joint end 230 when it is inserted into tubular body 210. The springs compress and provide resistance to the slip joint end 230 as it is forced into the tubular body 210. It should be noted that in various embodiments of the present invention, the purpose of two stage nested coil springs 228 is to always remain in contact so that the axle and frame will always have a force on them to resist axle wrap. It should also be noted, however, that the present invention is also well suited to an embodiment in which a suitable single spring is used based upon spring design, spring constraints, etc.

FIGS. 4A, 4B and 4C are internal views 400, 425 and 450 respectively, showing embodiments of the two stage nested coil springs 228 in different states of compression. For example, in 400 of FIG. 4A, the two stage nested coil springs 228 is shown with a minimal initial resistance spring rate. One example of a minimal initial resistance spring rate may be 220 lb/in. In contrast, FIG. 4C shows the two stage nested coil springs 228 at max resistance or full coil bind. At this position, the two stage nested coil springs 228 would provide no spring effect and the adjustable floating traction bar 110 would act as a solid member.

In FIG. 4B, the two stage nested coil springs 228 is shown at a location somewhere between the minimal initial resistance spring rate of FIG. 4A and the max resistance or full coil bind of FIG. 4C.

In general, the adjustability of the adjustable floating traction bar 110 is related to the spring preload and the ability of the traction bars to slip. The spring preload can be adjusted to best fit the driving situation based on how much resistance is needed to adequately control axle wrap. That is, utilizing the adjustability provided by adjustable floating traction bar 110 allows for one traction bar setup to be used, with maximum effectiveness, in a number of varying situations.

For example, in offroad use when suspension articulation is critical the adjustable floating traction bar 110 would be set to light preload. In daily commuting when unrestricted axle movement provides the best ride and axle wrap is only a concern when accelerating from a stop adjustable floating traction bar 110 would be set to a medium preload. When heavy loads or towing when high torque loads are required for starts and acceleration adjustable floating traction bar 110 would be set to medium/high preload. For competition drag racing or pulling when high torque/horsepower are required and little-to-no movement of axle is acceptable adjustable floating traction bar 110 would be set to max adjustment such that the coils are at bind.

Fitment

Referring again to FIG. 1 and to FIGS. 2A and 2B, the adjustable floating traction bar(s) 110 mount to fixed brackets located on the vehicles rear axle, e.g. axle bracket 105, and frame 101 rail, e.g., frame bracket 106. Moreover, frame bracket 106 is located in front of axle 104. That is, adjustable floating traction bar 110 is mounted to axle 104 and then toward the front 167 of the vehicle on frame 101. In other words, adjustable floating traction bar 110 is installed so it is in compression when axle wraps. It should be noted that, in various embodiments, fitment is crucial so that the mounts are positioned at the correct distance from each other so that the springs will work as designed.

In general, adjustable floating traction bar(s) 110 are installed as a pair, one on each side of the vehicle, located near the leaf spring 103. The adjustable floating traction bar 110 mounts to the axle 104 via the forged steel threaded eyelet 222 and to the frame 101 via the fabricated steel slip joint end 230. These mounting points are established based on the vehicle application, requiring the two-stage nested coil springs 228 to be preloaded to a specified adjustment of the forged steel threaded end. In one embodiment, the proper coil spring preload is set by threading the forged steel threaded eyelet 222 in or out. This sets the position the steel slip joint end 230 within the steel tubular body 210 and thus the amount of preload on the two-stage nested coil springs 228. The forged steel threaded eyelet 222 is then locked in place via jam nut 205 against the tubular body 210. Although a pair of traction bars is described in one embodiment of the present invention, the present invention is also well suited to an embodiment having a singular traction bar (for example, a shackle type design). Additionally, in another embodiment of the present invention the adjustable type design could also be a singular traction bar design, and, therefore, would not be comprised a pair of traction bars. Further, in various embodiments of the present invention mounting points could be to the frame, the axle, the leaf spring U-bolts, wheel structure, a shock, etc.

Operation

In one embodiment, under acceleration, as axle 104 begins to rotate or "wrap", the rotational force 121 will transmit to adjustable floating traction bar 110, through the 2-stage coil spring 228 and to the frame 101. The amount of wrap allowed will be dependent on the amount of force 121 being applied to the adjustable floating traction bar 110 and amount of preload set in the two-stage nested coil springs 228. This will also translate to the amount the traction bar slip joint end 230 will move before the two-stage nested coil springs 228 go to full bind (as shown in FIG. 4C). At that point the adjustable floating traction bar 110 essentially becomes a rigid member in compression.

In contrast, when the vehicle suspension is not experiencing an axle wrap condition, a negligible amount of load will be transferred through the adjustable floating traction bar 110. However, the adjustable floating traction bar 110 will not hinder the movement (compression or extension) of the leaf spring 103 suspension since the adjustable floating traction bar 110 is allowed to extend to meet those position requirements. For the same reason, the adjustable floating traction bar 110 will not hinder axle 104 articulation or the condition in which one leaf spring 103 is compressed while another leaf spring 103 extended. Moreover, the frame end slip joint 230 and axle side forged steel eyelet 222 will allow for free rotation during this articulation scenario. Further, under heavy braking, since the adjustable floating traction bar 110 is mounted to the frame forward of axle 104, axle 104 will be able to relax rearward as the bars extend in order to maintain constant contact with the road surface.

With reference now to FIGS. 5A-C, are section views showing an embodiment of the disclosed adjustable floating traction bar 110 is provided. Section view 500 provides FIG. 5A, a tubular body, a cross section FIG. 5B of the tubular body, and FIG. 5C of the components of tubular body in proper assembled placement prior to the breakdown detailed portions shown in FIGS. 6A-9C. That is, an adjustable floating traction bar wall 600, traction bar plug 255, also referred to as welded stop, traction bar slip joint portion end 800 and traction bar threaded end 900.

In each of FIGS. 5A-9C, a number of dimensions and materials are provided for purposes of clarity, however, as with each of FIGS. 5A-9C, although measurements are provided, they are provided as an embodiment. It should be appreciated that changes in materials and/or dimensions may be utilized in different embodiments while remaining within the scope of the inventive aspects. In one embodiment, traction bar plug 700 is welded to traction bar slip joint portion end 800 first. Further, embodiments of the present invention are also well suited to using a load cell to determine the exact amount of force through the bar and the system adjusts accordingly. Also, embodiments of the present invention are also well suited utilizing a sleeve in place of a spring to create a rigid member and have no spring effect on the system.

Figure 6A:
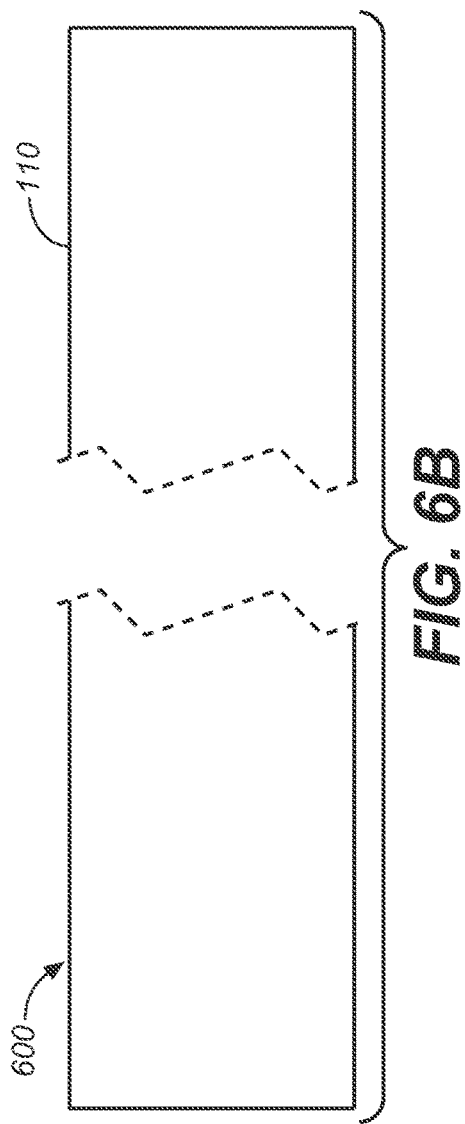
FIGS. 6A and 6B are section views showing an embodiment of the disclosed adjustable floating traction bar wall.
Figure 6B:
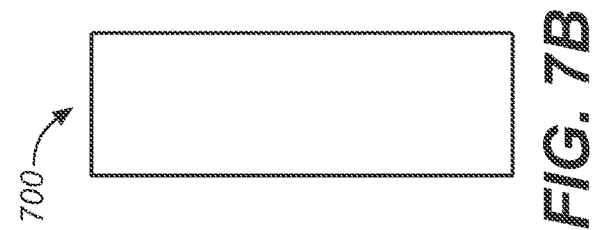

Referring now to FIGS. 6A and 6B, are section views showing an embodiment of the disclosed adjustable floating traction bar wall 600 is provided. In one embodiment, the material is 2.000"×0.1875" wall DOM or 7 GA. ERW steel tubing.

Figure 7A:
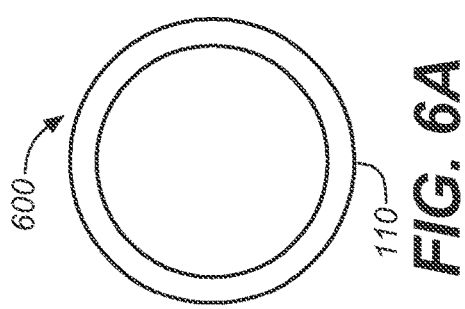
FIGS. 7A and 7B are section views showing an embodiment of the disclosed adjustable floating traction bar plug.
Figure 7B:
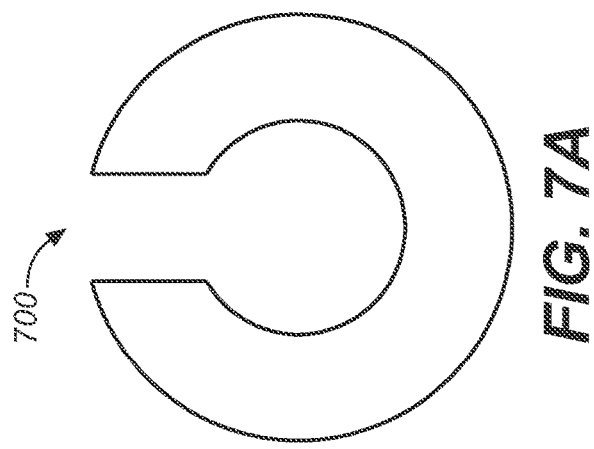
Figure 8A:
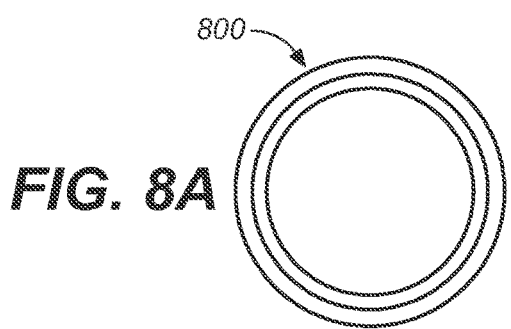
FIGS. 8A, 8B, 8C, 8D and 8E are section views showing an embodiment of the disclosed adjustable floating traction bar slip joint portion end.
Figure 8B:
Figure 8D:
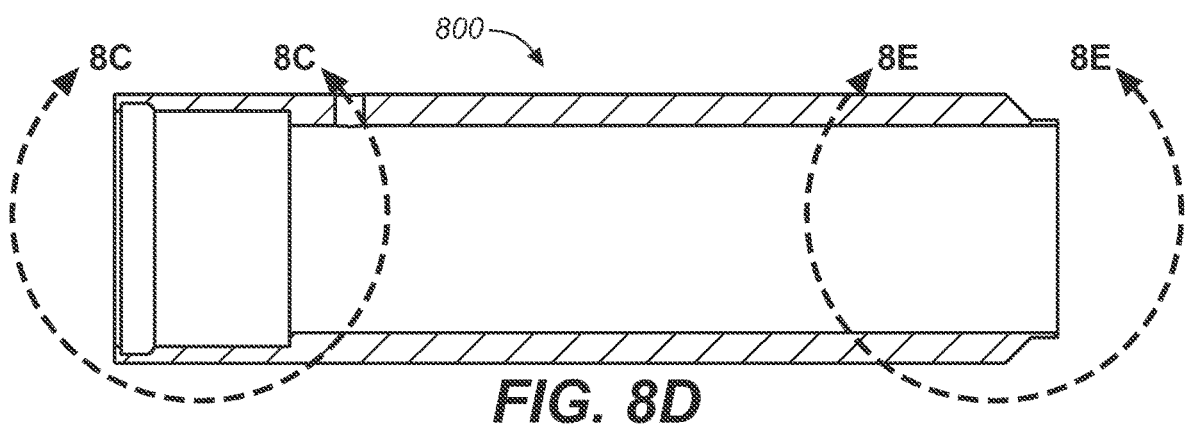
Figure 8C:
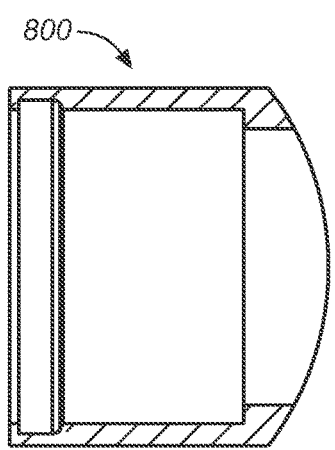
Figure 8E:
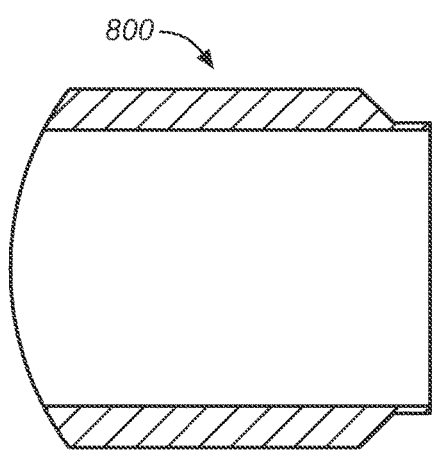
Figure 9A:
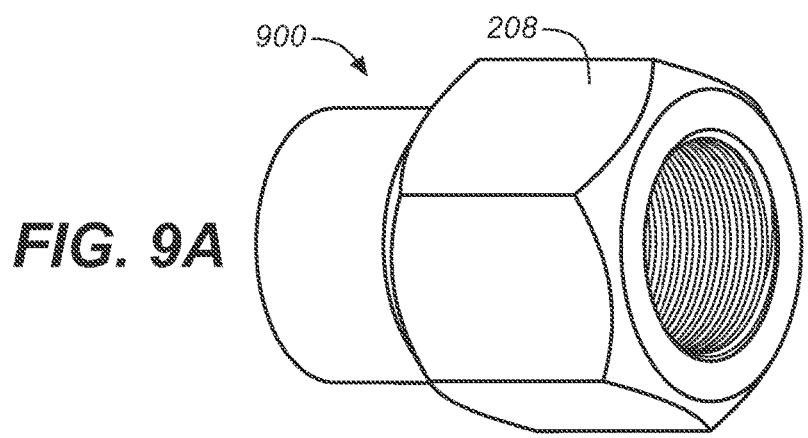
FIGS. 9A, 9B, 9C and 9D are section views showing an embodiment of the disclosed adjustable floating traction bar threaded portion distal end.
Figure 9B:
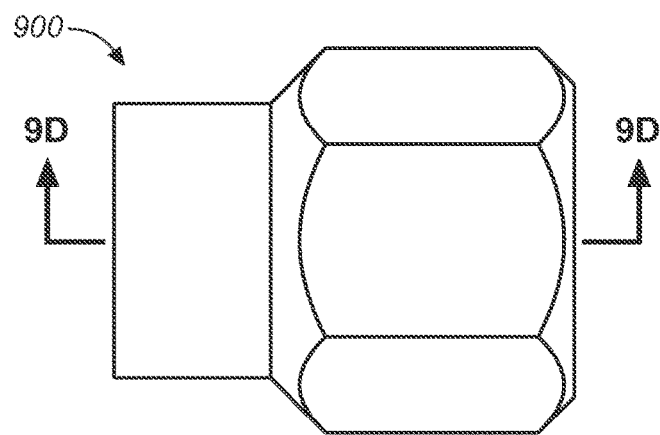
Figure 9C:
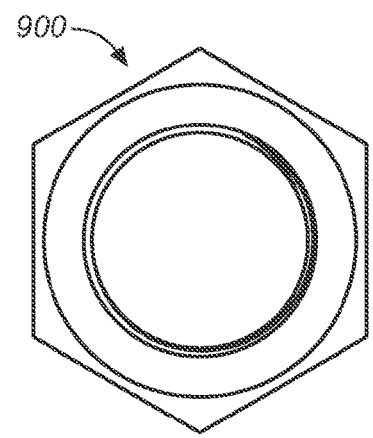
Figure 9D:
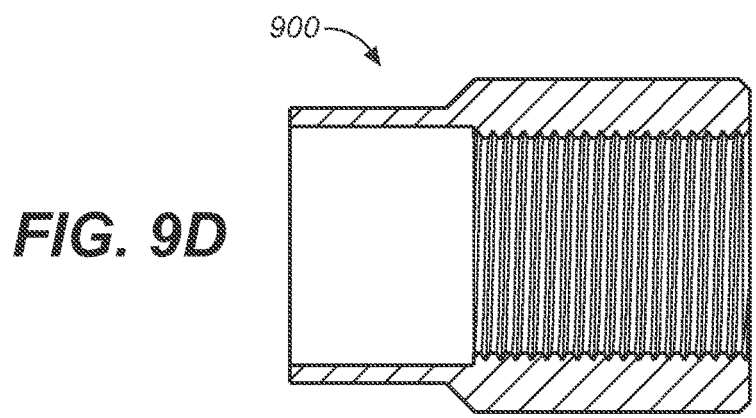
Figure 10:
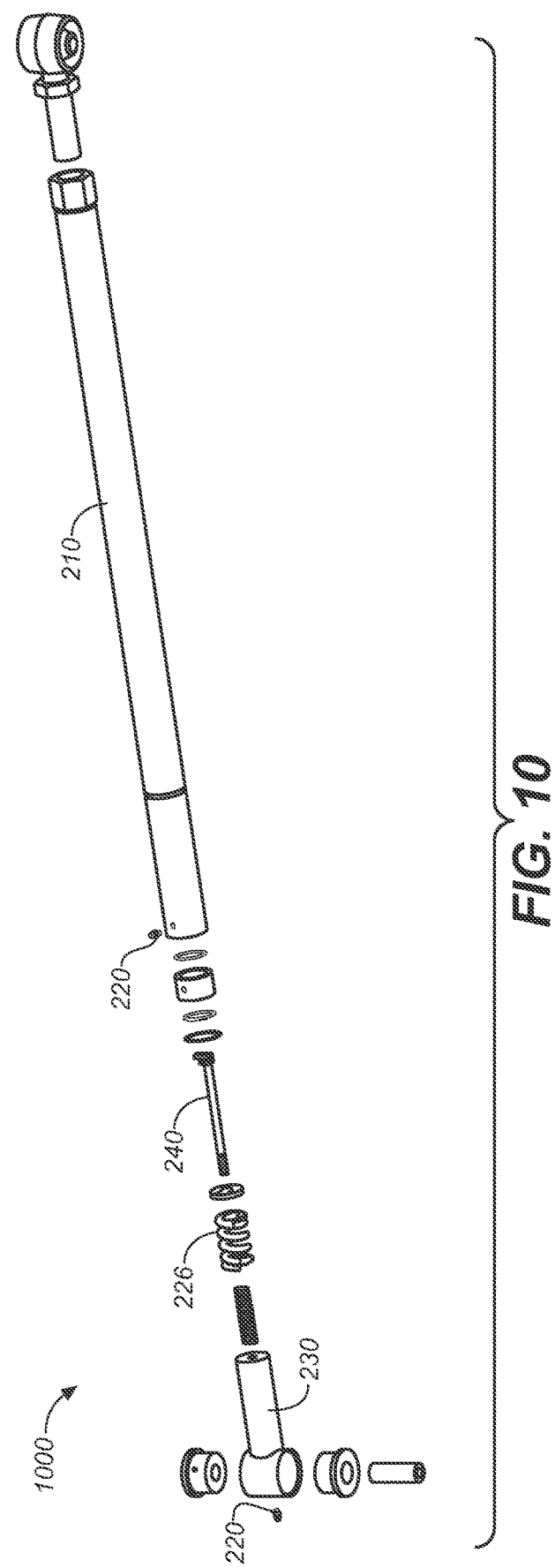
FIG. 10 is an exploded perspective view of an embodiment of the present invention.

With reference now to FIGS. 7A and 7B, are section views showing an embodiment of the disclosed adjustable floating traction bar plug 700 is provided. In one embodiment, the material is 1.500"×0.375" wall DOM steel tubing. In another embodiment, the material may optionally be 0.500 A-36 steel or equivalent (laser cut).

Referring now to FIGS. 8A-E, are section views showing an embodiment of the disclosed adjustable floating traction bar slip joint portion end 800 is provided. In one embodiment, the material is 2.000"×0.250" wall DOM steel tubing.

With reference now to FIGS. 9A-D, are section views showing an embodiment of the disclosed adjustable floating traction bar threaded portion distal end 900 is provided. In one embodiment, the threaded portion is made using a weld in bung. In one embodiment, the material is 1.875"×0.375" wall DOM steel tubing or hex stock.

It should also be noted that in various embodiments, the present invention biasing of the floating traction bar is achieved through air pressure or some and/or fluid damping/pressure. Additionally, in various embodiments of the present invention, a shock absorber is utilized in place of nested springs. Additionally, in various embodiments of the present invention, a lockout feature is employed to control movement of the floating traction bar.

Further, in various embodiments of the present invention, the traction bar includes a setting control mechanism to enable the selection of, for example, a firm setting or a soft setting. Various embodiments having a setting control mechanism also utilize electronic controls and inputs to enable setting selection. Also, various embodiments of the present invention include an automatic lockout based on, for example, payload, towing input, engine torque, axle load, and the like. Further, various embodiments of the present invention include an automatic lockout or unlock based on front suspension movement, road conditions, yaw or roll of vehicle, and the like. Various embodiments having a setting control mechanism also enable user selected lockout or unlock.

It should be appreciated that embodiments, as described herein, can be utilized or implemented alone or in combination with one another. While the present invention has been described in particular embodiments, it should be appreciated that the present invention should not be construed as limited by such embodiments, but rather it should defined by the following claims.

What we claim is:

1. An adjustable floating traction bar comprising:
    a rigid body, said rigid body having a first distal end, said rigid body having an opposing distal slip end, said opposing distal slip end having a bushing comprising a slip joint;
    a weld stop coupled to said rigid body, said weld stop disposed between said first distal end and said opposing distal slip end;
    an eyelet, said eyelet having an end and an opposing spherical joint end, said end of said eyelet configured to mount to said first distal end of said rigid body, said spherical joint end configured to provide a connection point to an axle of a vehicle;
    said slip joint having a first end slidably coupleable to said bushing of said rigid body, said slip joint further having an opposing end coupled to said first end, said opposing end of said slip joint having an eyelet configured to provide a connection point to a vehicle frame; and
    a two-stage nested coil spring, said two-stage nested coil spring comprising a first spring and a second spring, said first spring having a spring rate which differs from a spring rate of said second spring, said two-stage nested coil spring located inside said slip end of said rigid body to rest against said weld stop, said two-stage nested coil spring also rests against said slip joint inserted into said rigid body, said two-stage nested coil spring compresses and provides resistance to said slip joint as said slip joint is forced into said rigid body.

2. The adjustable floating traction bar of claim 1, further comprising:
    a jam nut fixedly coupling said end of said eyelet with said first distal end of said rigid body.

3. The adjustable floating traction bar of claim 1, wherein said spherical joint allows for a limited degree of angular movement and an unrestricted rotational freedom.

4. The adjustable floating traction bar of claim 1, wherein said eyelet of said opposing end of said slip joint contains polyurethane bushings and a steel sleeve.

5. The adjustable floating traction bar of claim 1, wherein said bushing of said opposing distal slip end of said rigid body provides rotation freedom.

6. The adjustable floating traction bar of claim 1, wherein said slip joint provides rotational freedom about said rigid body and movement along a center axis of said rigid body.

7. The adjustable floating traction bar of claim 1, wherein said rigid body is a steel tubular body.

8. An adjustable floating traction bar comprising:
    a rigid body, said rigid body comprising:
        a locking end;
        a slip end opposing said locking end; and
        a stop, said stop coupled to said body between said locking end and said slip end;
    a first coupler, said first coupler having an adjustable end and a coupler end, said adjustable end of said first coupler coupled with said locking end of said first coupler to form a locking adjustment connection, said coupler end of said first coupler configured to provide a connection point to a first portion of a vehicle;
    a second coupler, said second coupler having an adjustable end and a coupler end, said adjustable end of said second coupler coupled with said slip end of said rigid body to form a slip joint, said second coupler end configured to provide a connection point to a second portion of said vehicle; and
    a bias member coupled to said slip end of said rigid body, said bias member coupled to said stop of said rigid body, said bias member configured to apply a bias force to said adjustable end of said second coupler.

9. An adjustable floating traction bar comprising:
    a rigid body, said rigid body having a first distal end, said rigid body having an opposing distal slip end, said opposing distal slip end having a bushing comprising a slip joint;
    a weld stop coupled to said rigid body, said weld stop disposed between said first distal end and said opposing distal slip end;
    an eyelet, said eyelet having an end and an opposing spherical joint end, said end of said eyelet configured to mount to said first distal end of said rigid body, said spherical joint end of said eyelet configured to provide a connection point to an axle of a vehicle;
    said slip joint having a first end slidably coupleable to said bushing of said rigid body, said slip joint further having an opposing end coupled to said first end, said opposing end of said slip joint having an eyelet configured to provide a connection point to a vehicle frame; and
    a biasing member coupled to said rigid body, said biasing member providing a biasing force to said slip joint as said slip joint is forced into said rigid body.

10. The adjustable floating traction bar of claim 9 wherein said biasing member is comprised of a shock absorber.

11. The adjustable floating traction bar of claim 9 wherein said biasing member utilizes a shock absorber to generate said biasing force.

12. The adjustable floating traction bar of claim 9 wherein said biasing member utilizes air pressure to generate said biasing force.

13. The adjustable floating traction bar of claim 9 wherein said biasing member utilizes fluid pressure to generate said biasing force.

14. The adjustable floating traction bar of claim 9 further comprising:
    a lockout feature, said lockout feature coupled to said slip joint to control movement of said slip joint.

15. The adjustable floating traction bar of claim 1, further comprising:
    a jam nut fixedly coupling said end of said eyelet with said first distal end of said rigid body.

16. The adjustable floating traction bar of claim 1, wherein said spherical joint allows for a limited degree of angular movement and an unrestricted rotational freedom.

17. The adjustable floating traction bar of claim 1, wherein said eyelet of said opposing end of said slip joint contains polyurethane bushings and a steel sleeve.

18. The adjustable floating traction bar of claim 1, wherein said bushing of said opposing distal slip end of said rigid body provides rotation freedom.

19. The adjustable floating traction bar of claim 1, wherein said slip joint provides rotational freedom about said rigid body and movement along a center axis of said rigid body.

20. The adjustable floating traction bar of claim 1, wherein said rigid body is a steel tubular body.

* * * * *